United States Patent
Grumann et al.

(10) Patent No.: US 9,027,348 B2
(45) Date of Patent: May 12, 2015

(54) METHOD FOR RETROFITTING A FOSSIL-FUELED POWER STATION WITH A CARBON DIOXIDE SEPARATION DEVICE

(75) Inventors: Ulrich Grumann, Erlangen (DE); Ulrich Much, Erlangen (DE); Andreas Pickard, Adelsdorf (DE); Mike Rost, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 365 days.

(21) Appl. No.: 13/503,664

(22) PCT Filed: Nov. 2, 2010

(86) PCT No.: PCT/EP2010/066623
§ 371 (c)(1),
(2), (4) Date: Aug. 14, 2012

(87) PCT Pub. No.: WO2011/051494
PCT Pub. Date: May 5, 2011

(65) Prior Publication Data
US 2012/0304644 A1    Dec. 6, 2012

(30) Foreign Application Priority Data
Nov. 2, 2009    (DE) .......................... 10 2009 051 646

(51) Int. Cl.
*F01K 19/00*    (2006.01)
*F01K 23/10*    (2006.01)
*F01K 7/22*     (2006.01)
*F01K 23/14*    (2006.01)

(52) U.S. Cl.
CPC . *F01K 23/10* (2013.01); *F01K 7/22* (2013.01); *F01K 23/14* (2013.01); *Y02E 20/16* (2013.01)

(58) Field of Classification Search
CPC ........... F01K 7/22; F01K 23/14; F01K 23/10; F01K 7/38; F01K 7/40; F01K 17/04; F22B 37/008; Y02E 20/16
USPC .............. 60/657, 670, 649, 653, 772, 39.182, 60/39.5, 646, 660–663, 677–679; 96/4, 96/236; 423/220; 29/401.1; 110/215
See application file for complete search history.

(56) References Cited

U.S. PATENT DOCUMENTS 8,061,002 B2 * 11/2011 Briesch et al. ............... 29/401.1
2004/0221578 A1  11/2004 Iijima et al.
2008/0011161 A1 * 1/2008 Finkenrath et al. ................. 96/4
(Continued)

FOREIGN PATENT DOCUMENTS

CN    102596363 A1    7/2012
EP    0079598 B1      6/1988
(Continued)

*Primary Examiner* — Thomas Denion
*Assistant Examiner* — Kelsey Stanek

(57) ABSTRACT

A method for retrofitting a fossil-fueled power station is provided. The power station includes a multi-housing stream turbine with a carbon dioxide separation device. As per the method, a suction capability of the steam turbine is adapted for an operation of the carbon dioxide separation device to a process steam to be removed. The carbon dioxide separation device is connected via a process steam line to an intermediate superheating line. Further, an auxiliary condenser is connected to the carbon dioxide separation device. On failure or deliberate switching off of the carbon dioxide separation device surplus process steam is condensed in the auxiliary condenser.

8 Claims, 4 Drawing Sheets

(56) References Cited

U.S. PATENT DOCUMENTS

2010/0205964 A1* 8/2010 Maddaus et al. ............. 60/645
2011/0048011 A1   3/2011 Hirata

FOREIGN PATENT DOCUMENTS

| | | | |
|---|---|---|---|
| EP | 1445429 | A1 | 8/2004 |
| EP | 1473072 | A1 | 11/2004 |
| EP | 2305364 | A1 | 4/2011 |
| GB | 2470645 | A | 12/2010 |
| RU | 1815336 | A1 | 5/1993 |
| SU | 366267 | A1 | 1/1973 |
| SU | 775356 | A1 | 10/1980 |
| WO | WO 2005045316 | A2 | 5/2005 |
| WO | WO 2008023046 | A1 | 2/2008 |
| WO | WO 2011039263 | A1 | 4/2011 |

* cited by examiner

METHOD FOR RETROFITTING A FOSSIL-FUELED POWER STATION WITH A CARBON DIOXIDE SEPARATION DEVICE

CROSS REFERENCE TO RELATED APPLICATIONS

This application is the US National Stage of International Application No. PCT/EP2010/066623, filed Nov. 2, 2010 and claims the benefit thereof. The International Application claims the benefits of German application No. 10 2009 051 646.8 DE filed Nov. 2, 2009. All of the applications are incorporated by reference herein in their entirety.

FIELD OF INVENTION

The present invention relates to fossil-fueled power stations, and in particular, to retrofitting a fossil-fueled power station with a carbon dioxide separation device.

BACKGROUND OF INVENTION

A large amount of energy is required for the separation of carbon dioxide from emission gases of fossil-fueled power stations, for example combined cycle power stations (GUD) or coal-fired steam turbine power stations (DKW).

When a wet chemical absorption-desorption method is used for separation of carbon dioxide this energy must be applied in the form of thermal energy for heating the desorption process. Usually low-pressure steam from the steam circuit of the power station is used for this purpose.

To meet emission regulations GUD or DKW power stations without carbon dioxide separation must be retrofitted with a carbon dioxide separation device. These types of legacy stations generally do not yet have the appropriate precautions (Capture Readyness) for retrofitting of a carbon dioxide separation device.

Thus for example the machine house cannot be dimensioned sufficiently large for the additional piping for removal of the low-pressure steam, or the steam turbine or the power station process is not configured accordingly for the removal of low-pressure steam. With steam turbines with separate housings for the medium and low-pressure stage at least the removal of low-pressure steam at the overflow line is possible in a simple manner. On the other hand, for steam turbines with a single-housing medium and low-pressure stage, retrofitted units for removal of the necessarily large amount of steam are often not able to be realized, which is why the turbine has to be replaced in this case. In any event for the removal of low-pressure steam from the overflow line in the low-pressure section, the low-pressure section must be adapted to the modified suction capability (steam volume flow).

The removal of steam from other sources within the power station process is likewise not cost-effective or possible in a suitable manner Thus for example removal from an intermediate superheating line of the steam turbine without further measures leads to an unbalanced load of the boiler. The removal of high-quality steam for the carbon dioxide separation device must also be excluded without further measures, since this leads to unjustifiable energy losses.

A further problem which arises with the retrofitting of a carbon dioxide separation device is that on shutdown or failure of the carbon dioxide separation device the low-pressure temperature steam now not needed becomes superfluous. This excess steam cannot now simply be directed back into the steam turbine process since this is designed for operation with a carbon dioxide separation device, i.e. for a lower volume of steam.

SUMMARY OF INVENTION

The object of the invention is thus to specify a low-cost method for retrofitting a carbon dioxide separation device, wherein the fossil-fueled power station is also to be able to continue operation if the carbon dioxide separation device is not in operation or is switched off.

The object of the invention is achieved by the features of the independent claim.

In accordance with the invention the fossil-fueled power station is retrofitted with a carbon dioxide separation device. The fossil-fueled power station in this case can be a combined-cycle power station (GUD) with a waste heat steam generator (AHDE) or a steam turbine power station system (DKW) with a fired boiler. The GUD or DKW station also includes a steam turbine.

The invention is based on a steam turbine having a single-housing medium and low-pressure stage. As well as the medium and low-pressure stage the steam turbine also contains a high-pressure stage in a separate housing.

The inventive retrofitting of the fossil-fueled power station with a carbon dioxide separation device is undertaken in a number of stages which can occur simultaneously or also in a different sequence.

In this case the medium and low-pressure stage of the steam turbine is adapted in one step to the new suction capability which changes through the removal of process steam for the operation of the carbon dioxide separation device. In this case either the steam turbine path is adapted by exchanging components or parts of the low-pressure stage are replaced. The selection of the options is determined by the available steam turbine and the steam mass flow to be removed. In a further step the carbon dioxide separation device is connected via a process steam line to an intermediate superheating line. In the event of the carbon dioxide separation device being switched off the low-pressure steam will continue to be removed from the overflow line. Therefore an auxiliary condenser is connected in parallel to the carbon dioxide separation device in a further step. The auxiliary condenser serves to condense the excess process steam in the auxiliary condenser occurring during the failure or deliberate switching off of the carbon dioxide separation device.

In an advantageous embodiment of the inventive method the carbon dioxide separation device is connected via a process steam line to the hot intermediate superheating line, so that a reheated steam is provided as process steam. As an alternative the carbon dioxide separation device can advantageously be connected via a process steam line to the cold intermediate superheating line, so that a part-relaxed steam is provided as process steam.

In a particular development the process steam line is connected to a back pressure steam line. The removed process steam is brought to a process steam state by the back pressure steam line. Electrical energy is generated by a generator connected to the back pressure steam turbine. This means that the excess energy of the process steam is able to be used for the generation of electrical energy.

A further advantageous embodiment makes provision for the carbon dioxide separation device to be connected via a condensate return line to the condenser of the steam turbine. The condensate return line allows the return of the process steam consumed in the desorption process in the feed water circuit of the power station.

The fossil-fuel power station is advantageously embodied as a combined cycle power station (GUD), wherein the steam generator is a waste heat steam generator. As an alternative the fossil-fuel power station can also be designed as a steam turbine power station, with the steam generator being a fired boiler.

BRIEF DESCRIPTION OF THE DRAWINGS

The invention will be explained in greater detail below with reference to drawings, in which.

DETAILED DESCRIPTION OF INVENTION

Figure 1:
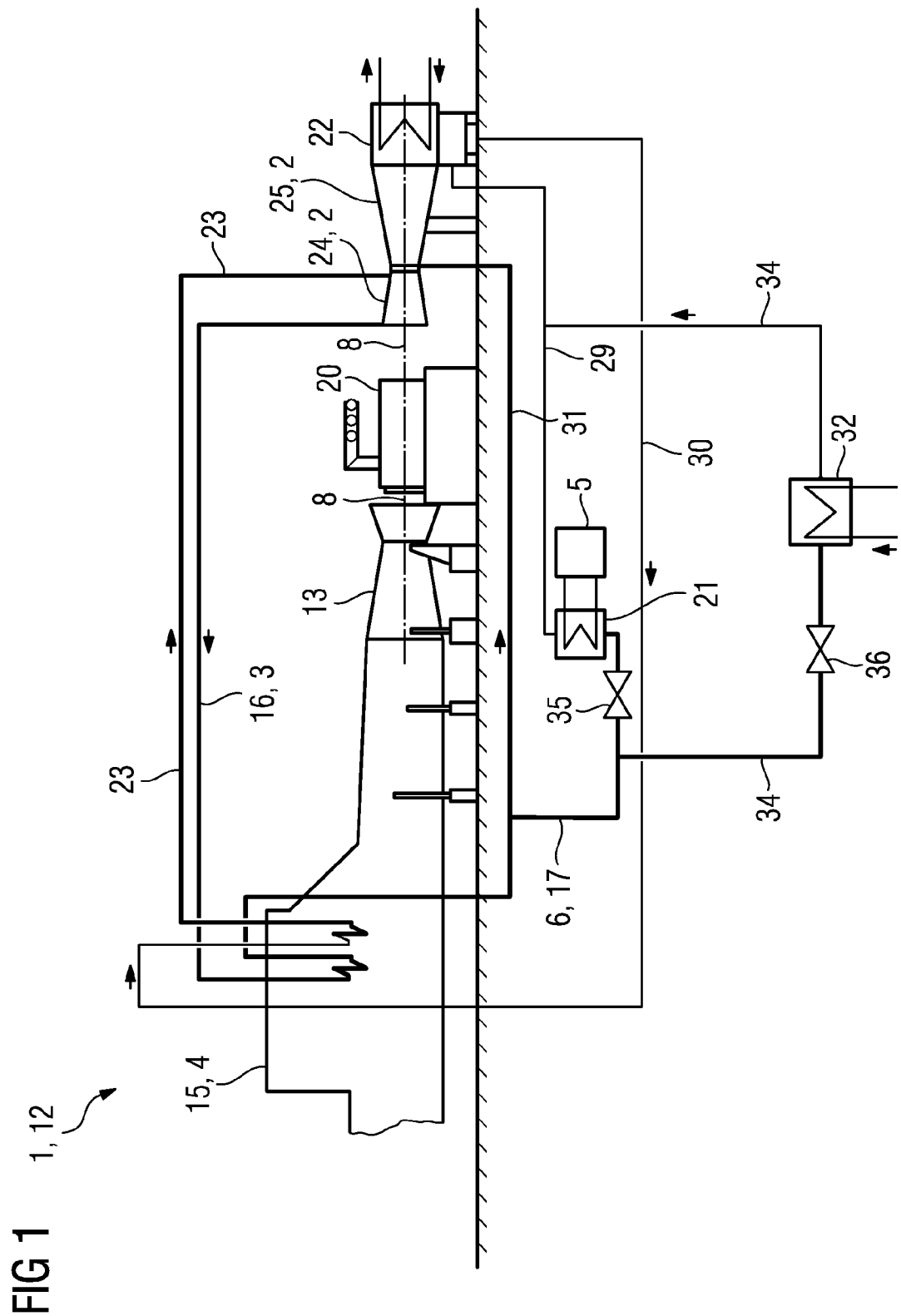
FIG. 1 shows a fossil-fuel power station which is retrofitted by the inventive method with a carbon dioxide separation device

FIG. 1 shows a fossil-fueled power station 1 with a carbon dioxide separation device 5. The fossil-fueled power station 1 is designed here as a combined-cycle power station (GUD) 12. The combined-cycle power station 12 is shown as a simplified diagram and essentially consists of a gas turbine 13, a steam turbine 2, a generator 20 and a steam generator 4 connected into the waste gas duct of the gas turbine 13, embodied as a waste heat steam generator 15. The steam turbine 2 consists of a high-pressure stage 24 and a medium and low-pressure stage 25. The gas turbine 13, the generator 20 and the steam turbine 2 are located on a common shaft 8. A condenser 22 is connected downstream from the steam turbine 2.

The high-pressure stage 24 is connected to the steam generator 4 for conducting fresh steam by a fresh steam line 23 and for feeding back steam via a steam feedback line 3, or a cold intermediate superheating line 16. The medium and low-pressure stage 25 is connected via a heart intermediate superheating line 31 to the steam generator 4. A process steam line 6 is connected to the hot intermediate superheating line 31 for tapping off process steam 17.

For the retrofitting initially the suction capability of the medium and low-precious stage of the steam turbine 2 has been adapted. This was done by replacing components or by adapting parts of the medium and low-pressure stage 25. Subsequently the carbon dioxide separation device 5 was connected via a heat exchanger 21 through a process steam line 6 to the hot intermediate superheating line 31. Furthermore a bypass line 34 has been laid in parallel to the carbon dioxide separation device 5 into which an auxiliary condenser 32 is connected.

From the heat exchanger 21 a condensate is routed out via a condensate feedback line 29 into the condenser 22. The condenser feedback line 29 is accordingly connected to the condenser 22 for this purpose. Finally a condensate line 30 is provided, which connects the condenser 22 to the steam generator 4, in order to close the feed water circuit.

In the operation of the fossil-fueled power station 1, with the carbon dioxide separation device 5 switched on, the process steam 17 is now taken from the hot intermediate superheating line 31 and is supplied via the process steam line 6 to the heat exchanger 21, which in its turn outputs the heat to the carbon dioxide separation device 5. In this operating case a first valve 35, which is connected into the process steam line 6 after the branch of the bypass line 34, is opened. A second valve 36, which is connected into the bypass line 34 before the auxiliary condenser 32, is closed.

If a fault occurs in the carbon dioxide separation device 5, or if this device is switched off, the process steam 17 must also be taken from the hot intermediate superheating line 31, since the medium and low-pressure stage 25 is now longer designed by the retrofit to accept this steam. The process steam is therefore conveyed via the bypass line 34 into the auxiliary condenser 32. To this end the first valve 35 is closed and the second valve 36 in the bypass line 34 is opened.

Figure 2:
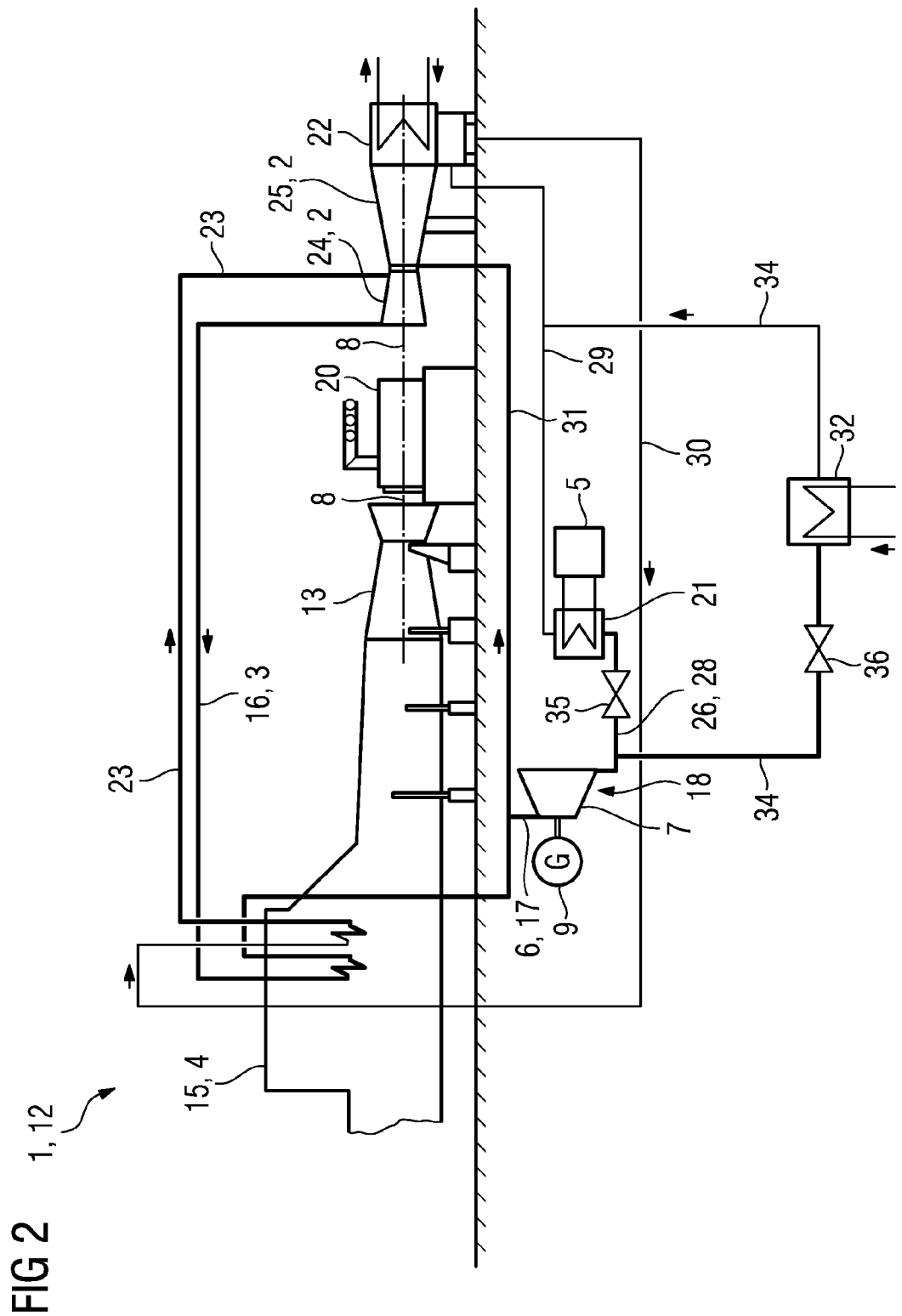
FIG. 2 shows a development of the retrofitted fossil-fuel power station shown in FIG. 1

FIG. 2 shows a development of the retrofitted fossil-fueled power station shown in FIG. 1, which has been retrofitted through the inventive method with a carbon dioxide separation device. In the version shown in FIG. 2 a back-pressure steam turbine 7 is provided as well as the steam turbine 2, which is connected into the process steam line 6. In the back-pressure steam turbine 7 a relaxation process 18 of the process steam 17 to a saturated steam 26 takes place. The process steam 17 is converted in this case by a generator 9 connected to the back-pressure steam turbine into electrical energy. The exit temperature from the back-pressure steam turbine lies at around 290° C.

Figure 3:
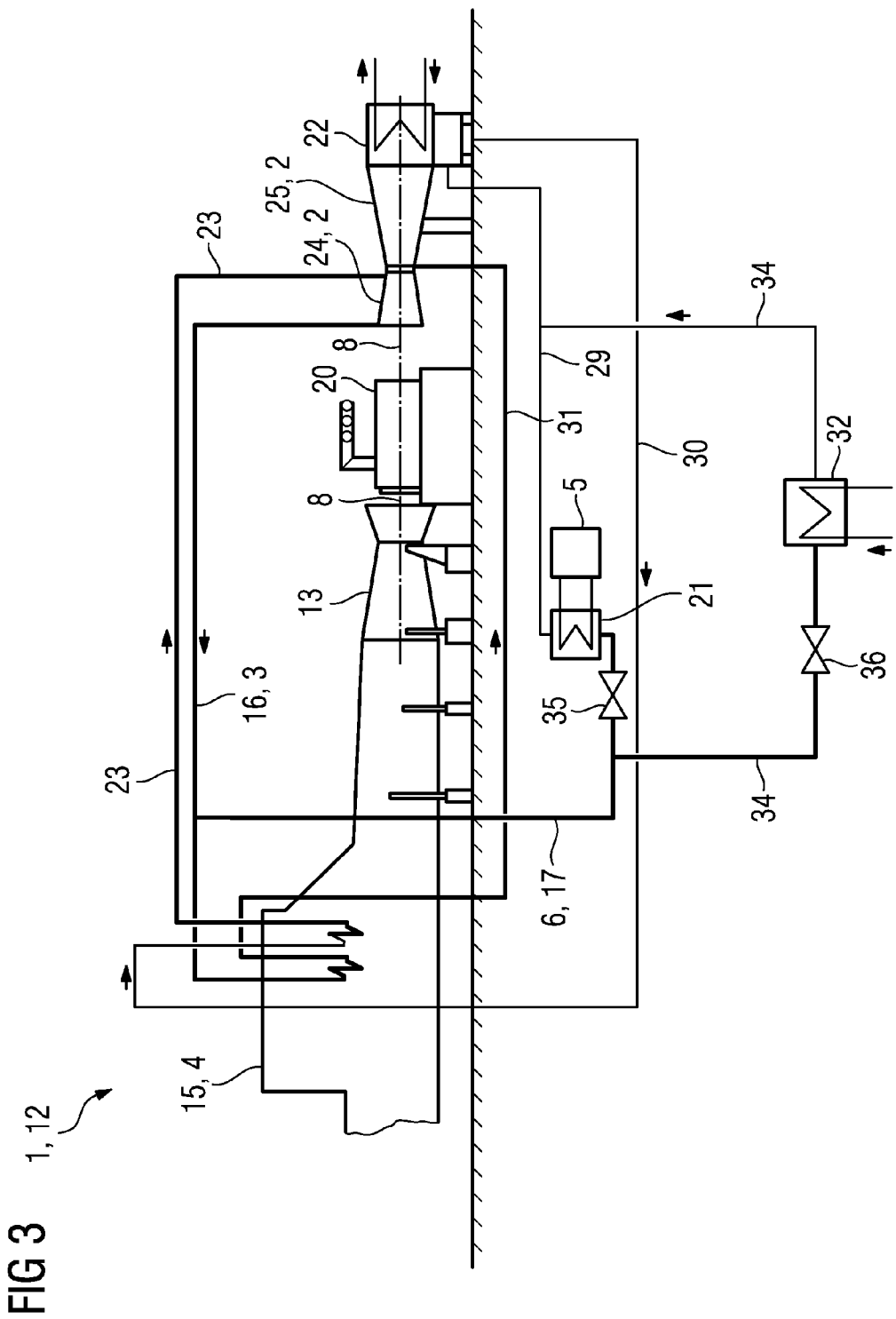
FIG. 3 shows a fossil fuel power station which has been retrofitted by an alternative embodiment of the inventive method with a carbon dioxide separation device

FIG. 3 shows a fossil-fueled power station which has been retrofitted by an alternative embodiment of the inventive method with a carbon dioxide separation device. In the present exemplary embodiment the carbon dioxide separation device 5 has been connected via a heat exchanger 21 through a process steam line 6 to the cold intermediate superheating line 16, wherein a partly-relaxed steam is provided as process steam in the process steam line 6. No back-pressure steam turbine is provided.

Figure 4:
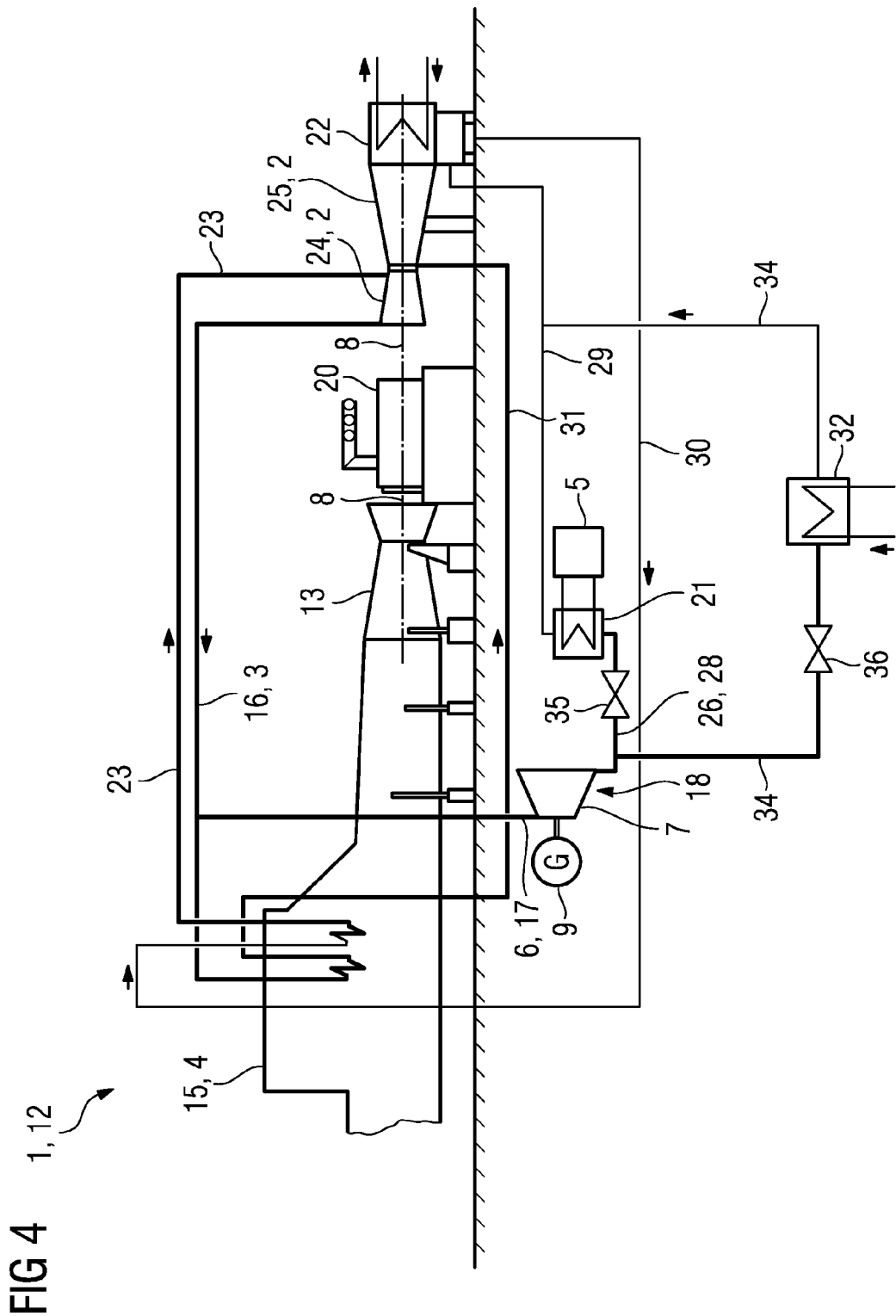
FIG. 4 shows a development of the retrofitted fossil-fuel power station shown in FIG. 3

Like FIG. 3, FIG. 4 shows the removal of process steam 17 or the connection of the process steam line 6 to the cold intermediate superheating line 16. In the development of FIG. 4, by comparison with FIG. 2, a back-pressure steam turbine 7 is now connected into the process steam line 17. The exit temperature of the back-pressure steam turbine 7 lies at around 160° C. As in FIG. 2 a generator is provided for power generation.

The invention claimed is:

1. A method for retrofitting a fossil-fueled power station, the power station comprising a multi-housing steam turbine with a carbon dioxide separation device, the method comprising:
configuring a suction capability of the steam turbine for an operation of the carbon dioxide separation device to a process steam to be removed,
connecting the carbon dioxide separation device via a process steam line to a cold intermediate superheating line feeding back steam from the steam turbine to a steam generator for reheating, wherein a partly-relaxed steam is provided as process steam in the process steam line from the cold intermediate superheating line, and
connecting an auxiliary condenser to the process steam line, in parallel to the carbon dioxide separation device, wherein on failure or deliberate switching off of the carbon dioxide separation device surplus process steam is condensed in the auxiliary condenser.

2. The method as claimed in claim 1, wherein a back-pressure turbine is connected into the process steam line.

3. The method as claimed in claim 1, wherein the carbon dioxide separation device is connected via a condensate feedback line to a condenser of the steam turbine.

4. The method as claimed in claim 1, wherein the fossil-fueled power station is a combined cycle power station, wherein the steam generator is a waste heat steam generator.

5. The method as claimed in claim 1, in which the fossil-fueled power station is a steam turbine power station, wherein the steam generator is a fired boiler.

6. A fossil-fueled power station which is retrofitted as claimed in the method according to claim 1.

7. The method according to claim 1, wherein the carbon dioxide separation device is connected to the process steam line via a heat exchanger.

8. A method for retrofitting a fossil-fueled power station, the power station comprising a multi-housing steam turbine with a carbon dioxide separation device, the method comprising:
- configuring a suction capability of the steam turbine for an operation of the carbon dioxide separation device to a process steam to be removed,
- connecting the carbon dioxide separation device via a process steam line to an hot intermediate superheating line feeding reheated steam from a steam generator to a intermediate or low pressure stage of the steam turbine, wherein a portion of the reheated steam is tapped as process steam in the process steam line, and
- connecting an auxiliary condenser to the process steam line, in parallel to the carbon dioxide separation device, wherein on failure or deliberate switching off of the carbon dioxide separation device surplus process steam is condensed in the auxiliary condenser.

* * * * *